March 20, 1951  J. P. KOESTER ET AL  2,545,816
FATIGUE TESTER
Filed June 29, 1948   3 Sheets-Sheet 1
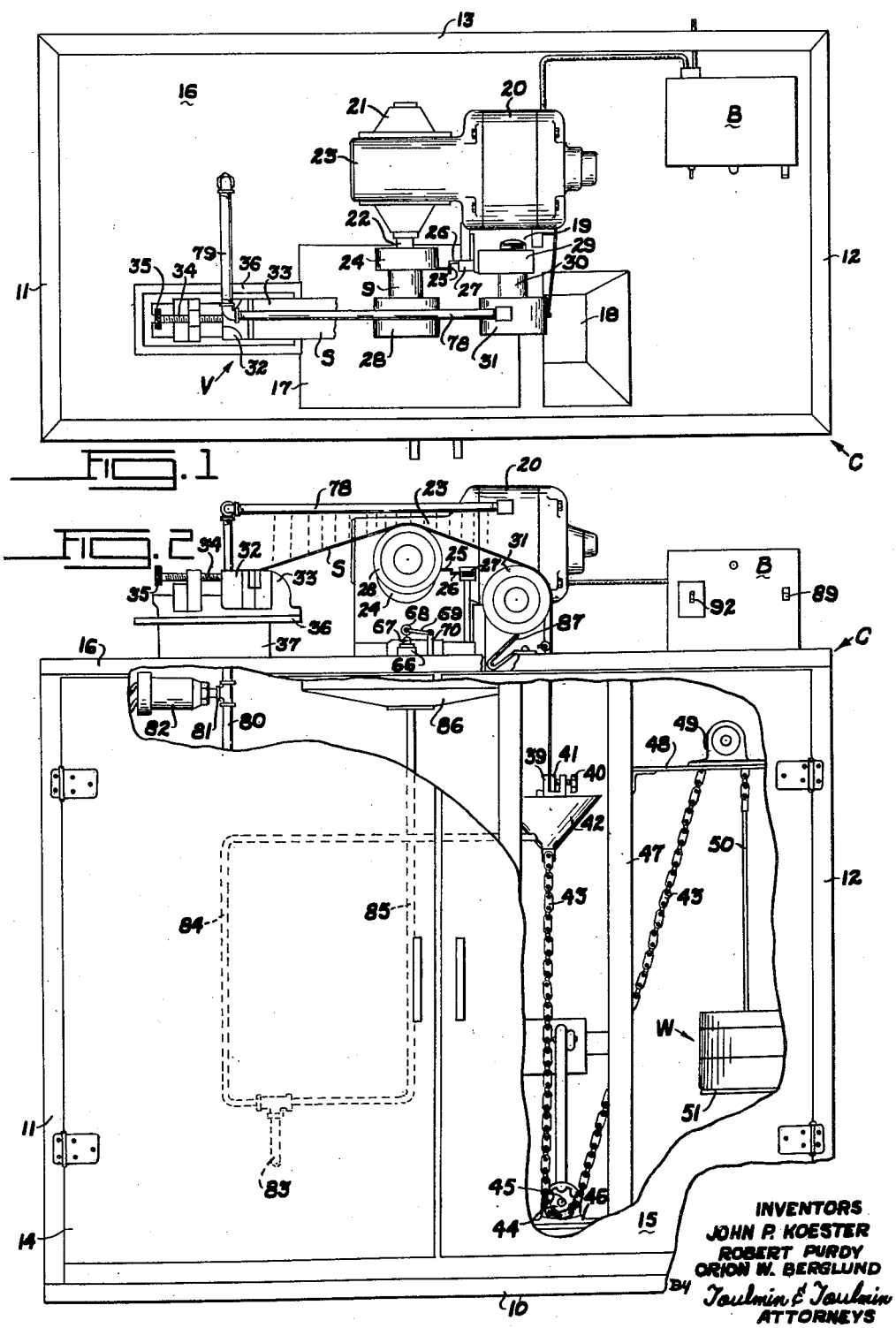
INVENTORS
JOHN P. KOESTER
ROBERT PURDY
ORION W. BERGLUND
BY Toulmin & Toulmin
ATTORNEYS

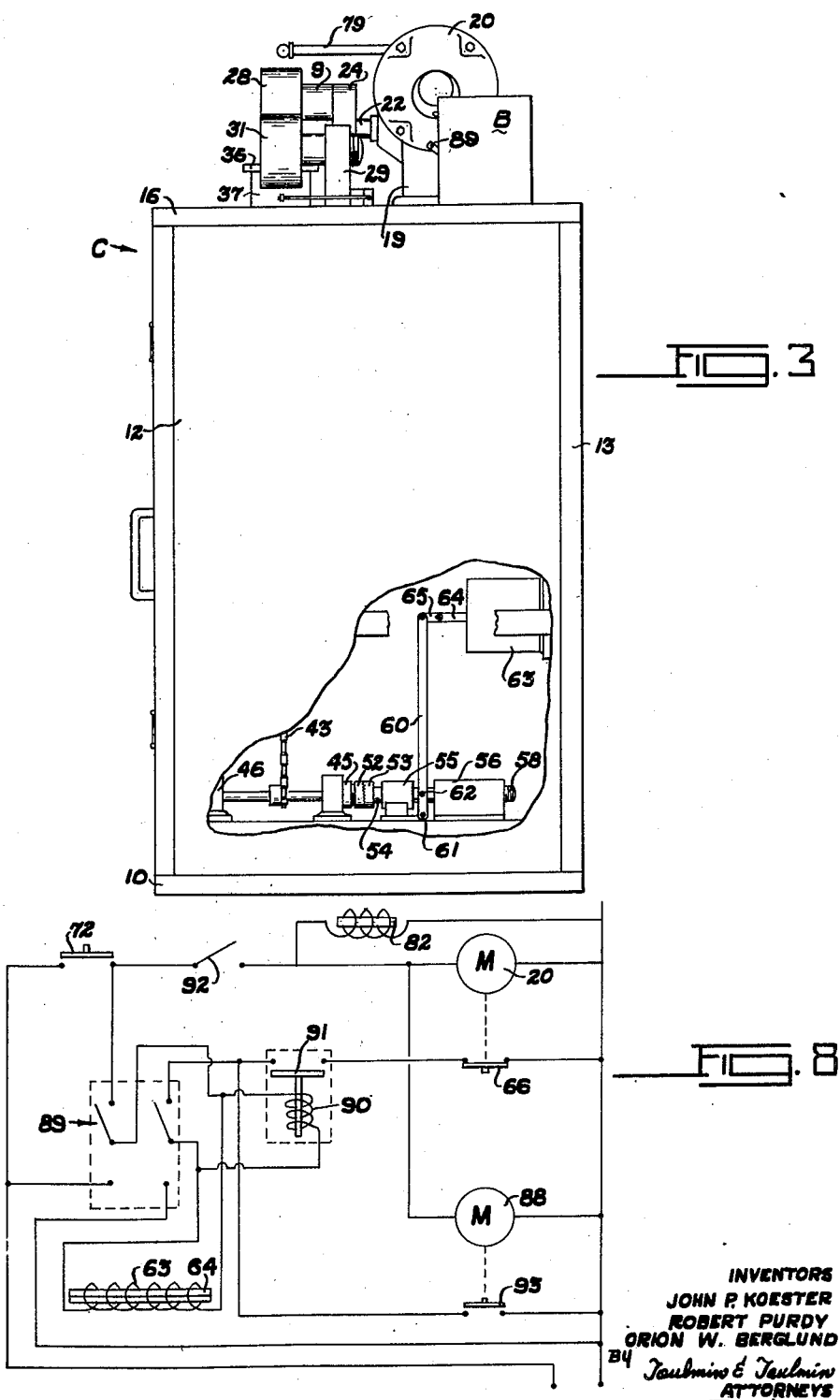

March 20, 1951   J. P. KOESTER ET AL   2,545,816
FATIGUE TESTER
Filed June 29, 1948   3 Sheets-Sheet 3
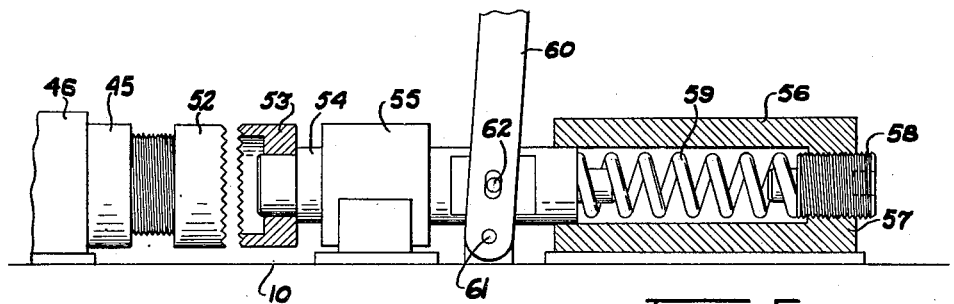
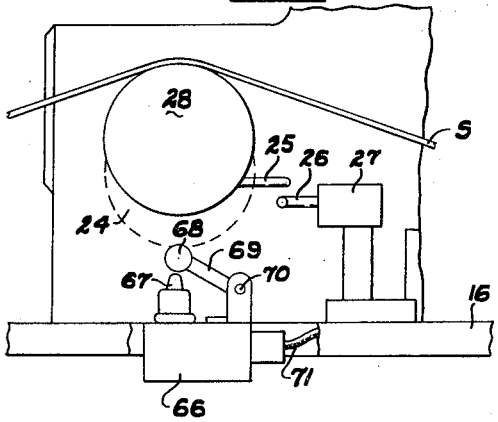
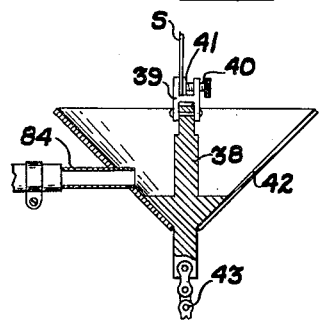
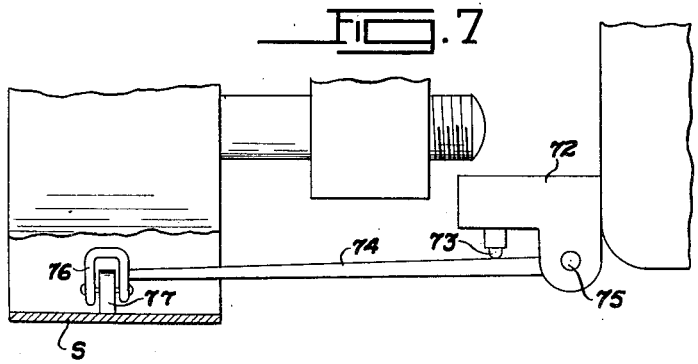
INVENTORS
JOHN P. KOESTER
ROBERT PURDY
ORION W. BERGLUND
BY Toulmin & Toulmin
ATTORNEYS Patented Mar. 20, 1951

2,545,816

UNITED STATES PATENT OFFICE 2,545,816

FATIGUE TESTER

John P. Koester and Robert J. Purdy, Piqua, and Orion W. Berglund, Dayton, Ohio, assignors to The Orr Felt and Blanket Company, Piqua, Ohio, a corporation of Ohio Application June 29, 1948, Serial No. 35,796

12 Claims. (Cl. 73—91)

The present invention relates to apparatus for testing the fatigue qualities of felts such as are commonly employed in the paper making industry, and is concerned primarily with certain novel methods and apparatus designed to carry out tests in a comparatively short period of time.

At the present time felts are extensively employed in paper making machines, and it has been found desirable to subject a specimen of a felt to tests under the conditions comparable to those which are actually encountered by the felts so as to know in advance just what may be expected of the felt when installed in machines.

Accordingly, the present invention has in view as its foremost objective the provision of a method and apparatus for subjecting specimens of felt to a fatigue test and under conditions comparable to those existing in the paper making industry.

In paper making machines the felts are subjected to the moisture from the stock and hence are wet all the time the machine is in operation. Thus another object of the invention is the provision, in a method for testing the fatigue of a paper making felt, of the step of wetting the felt and maintaining it wet during the entire testing period.

A further object of the invention is the provision, in apparatus for testing paper making felt as to fatigue, means for wetting the specimens being tested during the test period.

Another highly important object of the invention is the provision of a method of the character indicated, which includes the step of subjecting a specimen to a predetermined tension and while so tensioned periodically flexing the specimen.

In carrying out this idea one end of the specimen is securely anchored at a fixed location and the specimen passed over a cam follower and around a roller with a weight being operatively connected to the free end of the specimen. Rotation of the cam follower causes flexing of the specimen at periodic intervals.

Yet another object of the invention is the provision of the method aforesaid which includes the step of counting the number of times the specimen is flexed during any test. This may be accomplished by operatively connecting a mechanical counter to the cam follower.

While a method which operates under the principles so far announced is capable of carrying out a fairly accurate fatigue test on a specimen of a paper making felt, a considerable time will elapse before the felt will give way under fatigue.

To the end of speeding up the test, a further object is to provide a method of the type noted, which includes the step of holding the free end of the felt which has been tensioned by the weight immovable, and then stretching the felt between its fixed ends. This stretching is carried out at predetermined time intervals between the flexing under tension, with the result that the specimen will break down much sooner than is the case when this step is omitted.

Yet a further object of the invention is the provision of a method of the character aforesaid, which includes the step of automatically discontinuing the wetting, flexing and stretching operations coincident with failure of the specimen under the test.

Another highly important object of the invention is the provision of apparatus for subjecting a specimen of a felt to a fatigue test, and which apparatus includes means for anchoring one end of the specimen, means for placing the specimen under tension from the other end, and instrumentalities for flexing the specimen between the two ends. The latter means preferably takes the form of a rotatable cam follower that engages the felt. The tensioning means preferably takes the form of a weight that is operatively connected to the free end of the felt.

Still another object is the provision in apparatus of the type noted, of means for holding the free end of the felt fixed after it has been tensioned, and means for stretching the felt between its fixed ends at periodic intervals.

This idea is carried out by suspending a weight from a chain and passing the chain over a sprocket, with which a clutch is operatively connected. When this clutch is disengaged the weight is effective on the felt to tension it, and when the clutch is engaged the end of the felt is fixed.

Another highly important object of the invention is the provision, in apparatus of the type indicated, of control instrumentalities which are operatively connected to the clutch for causing its disengagement at predetermined intervals.

Still another object of the invention is the provision of a main control switch which controls the operation of the water supply, the motor for driving the flexing cam follower, and a motor in the control instrumentalities.

This main control switch is normally maintained closed under the influence of a spring arm which engages the specimen. When the specimen fails the spring arm is released to open the control switch and discontinue the operation of the water supply and motor as aforesaid.

Various other more detailed objects and advantages of the invention such as arise in carrying in the above noted ideas in a practical embodiment will in part become apparent and in part be hereinafter stated as the description of the invention proceeds.

The invention therefore comprises a method and apparatus for subjecting the specimen of a paper making felt to a fatigue test and which includes steps and means for wetting the specimen, placing it under tension, periodically flexing the specimen, and stretching the specimen with its ends fixed at predetermined intervals, together with control means for automatically discontinuing the operation when the specimen fails.

For a full and more complete understanding of the invention reference may be had to the following description and accompanying drawings wherein:

Figure 1 is a top plan view of fatigue testing apparatus designed in accordance with the precepts of this invention;

Figure 2 is a front view of the apparatus shown in Figure 1 with a portion of the cabinet broken away to reveal mechanisms therein;

Figure 3 is an end elevation with a portion of the cabinet broken away;

Figure 4 is an enlarged detailed view partly in elevation and partly in section of the clutch and associated mechanism;

Figure 5 is a view taken on an enlarged scale of the flexing cam and switch operated thereby;

Figure 6 is another enlarged detailed view mostly in section of one of the water collecting drains;

Figure 7 is an enlarged detailed plan view, with the specimen shown in section, of the switch for discontinuing the operation when the specimen fails, and operating means for the switch; and Figure 8 is a wiring diagram showing the relation between the several electrical instrumentalities.

Referring now to the drawings, wherein like character references denote corresponding parts, and first more particularly to Figures 1, 2, and 3, a casing or cabinet is referred to in its entirety by the reference character C.

This cabinet C comprises a bottom 10 from which upstand end walls 11 and 12 and a rear wall 13. The front of the cabinet is defined by doors 14 and 15 which are hingedly connected to the end walls 11 and 12 as illustrated in Figure 2.

A top 16 is arranged in substantially a horizontal plane and is formed with openings at 17 and 18 for a purpose to be later described.

Carried by the top 16 is a pedestal 19 (Figure 3) which supports an electric motor 20. The top 16 also carries a supporting bracket 21 in which is journaled a shaft 22 that is operatively connected to the drive shaft of the motor 20 by gearing which is included in the housing represented at 23.

This particular gearing is not a part of the present invention, as all that is necessary is to drivably connect the drive shaft of the motor 20 with the shaft 22.

Drivably mounted on the shaft 22 is a cam 24 from which extends a finger 25. The latter is adapted to be engaged by an operating arm 26 of a counter such as represented diagrammatically at 27.

Any type of counter which will be effective to count the number of revolutions of the shaft 22 may be employed, although the invention has particularly in mind the use of a Veeder counter, which is available to the purchasing public.

Extending outwardly from the cam 24 and eccentrically with respect to the axis of the shaft 22 is an arm 9 and rotatably carried on the free end of this arm 9 is a cam follower 28.

Upstanding from the pedestal 19 is a supporting member 29 to which is anchored a shaft 30. Journaled on this shaft 30 is a roller 31. At this point it is well to note that this roller 31 is mounted on antifriction bearings to reduce friction to a minimum.

A vise is referred to generally by the character reference V. This vise V includes jaws 32 and 33, with the latter stationary and the jaw 32 movable under the influence of a screw stem 34 having an operating member 35 on the free end thereof. Jaws 32 and 33 are mounted for sliding movement in guideways formed in a table 36 which is supported from the top 10 by a block shown at 37.

The purpose of the vise V is to provide a firm anchorage for a specimen of felt to be tested. This specimen is represented at S, and as shown in Figure 2, one end of the specimen is anchored between the jaws 32 and 33. The specimen then passes over the cam follower 28 and thence over roller 31, where it is continued down through the opening 18 to the interior of the cabinet C.

The free end of the specimen S is secured to a connecting member 38 (see Figure 6) by a bracket 39 which carries a set screw 40 having a plate 41 at the end thereof which is adapted to securely grip the specimen. It is evident the set screw 40 may be unscrewed to release the specimen or tightened to firmly grip it.

As shown in Figure 6 the connecting member 38 carries a funnel 42 for water collecting purposes, as will be later explained. Below the funnel 42 a sprocket chain 43 is connected to the member 38. This chain is clearly shown in Figure 2 and continues downwardly and passes over a sprocket 44 that is drivably mounted on a shaft 45 which is journaled in a supporting bracket 46 that is anchored to the bottom 10.

The casing C is provided with a vertical partition 47 and a table 48 is supported from this partition and the end wall 12. Carried by this table 48 is a supporting bracket 49 which pivotally supports a sprocket (not illustrated) over which the chain 43 passes.

The free end of the chain 43 has a rod 50 connected thereto and the lower end of this rod carries an abutment plate 51 whereby one or more weights shown at W are adapted to be positioned on the rod 50.

It is evident that with the mechanism so far described the weights W are effective through the chain 43 and connecting member 38 to place the specimen S under tension.

Referring now more particularly to Figure 4 the shaft 45 is shown as carrying at its free end one element of a clutch which is designated 52. A complemental clutch element is shown at 53 and is rotatably mounted on a shaft 54 that is held against rotation by a block 55 that is anchored to the bottom 10. Any appropriate means for preventing rotation of the shaft 54 may be provided, such as by employing a non-circular interfit between the block 55 and the shaft 54. However, this shaft 54 is slidable in the block 55.

A cylindrical casing 56 is shown as supported from the bottom 10 and having a closed end 57 in which is threaded a screw plug 58. The opposite end of the casing 56 is open and slidably receives the shaft 54. An expansion coil spring 59 is interposed between the plug 58 and the shaft 54 and normally urges the clutch member 53 into engagement with the clutch member 52, whereby the shaft 45 is held against rotation.

A clutch actuating lever 60 is shown as pivotally mounted on the bottom of the casing as represented at 61, and a pin and slot connected at 62 operatively connects this lever 60 to the shaft 54. A solenoid is represented at 63 and the core of the solenoid which is shown at 64 is connected to the upper end of the lever 60 by a link shown at 65.

Referring now more particularly to Figure 5, the top 16 is shown as supporting a micro-switch, represented diagrammatically at 66 and which is supported from one edge of the opening. This switch includes an operating plunger 67, against which rests a roller 68 mounted at the free end of an arm 69, which is in turn pivotally mounted as shown at 70.

As the cam 24 rotates and reaches the downward position represented by the broken lines of Figure 5, it will bear against the roller 68 and press the plunger 67 downwardly to operate the micro-switch 66. The latter is included in the electrical circuit of the apparatus by the cable represented at 71. This circuit will be later explained.

Referring now more particularly to Figure 7, a main control switch is represented diagrammatically at 72. This switch 72 includes an operating plunger 73 which normally is engaged by the spring arm 74 to maintain the switch 72 closed and thereby complete the circuit to the various operating instrumentalities.

The spring arm 74 is pivotally mounted as represented at 75 at one end and at its other end carries a U-shaped yoke 76 which pivotally mounts a roller 77 that is urged against the inner face of the specimen S by the spring arm 74. Thus, as long as the specimen S remains intact the switch 72 will be closed, but when the specimen S fails, the free end of the arm is released and it will swing outwardly under its resilient tendencies and thus releases the plunger 73 to open the switch 72.

The apparatus also includes a system for wetting the specimen S as it is being tested. This system comprises a shower pipe 78 which is disposed over the top ply of the specimen S, as shown in Figure 2. This shower pipe 78 is connected by conduits 79 and 80 with the water supply. A valve is represented at 81 and this valve is normally maintained open by a solenoid represented at 82. Thus, when the valve 81 is open water is supplied to the shower pipe 78, but when this valve is closed this supply of water is discontinued.

A drain pipe for water which will fall over the wetted felt is represented by the broken lines at 83 in Figure 1. A conduit 84 connects the drain 83 to the funnel 42. Another conduit 85 connects the drain 83 with a drain pan 86 that is located immediately beneath the opening 17 in the top 16.

A deflector for water is also shown at 87 as carried by the top 16 and includes a scraper blade which engages the roller 31. This serves to deflect any water which might adhere to this roller 31.

While the use of water for wetting the specimen has been described, yet, it will be understood that other liquids can be used, depending upon the working conditions under which the specimen S should be tested to approximate actual working conditions. When special conditioning liquids are used it would be preferable to recirculate the liquid continuously. Under this condition the pipe 80 can be connected to the discharge outlet of a circulating pump that has the inlet thereof connected to a suitable tank containing the conditioning liquid. The waste pipe 83 would be connected to the tank to return the conditioning liquid.

Supported on the top 16 of the cabinet C is a control box B. This box B houses a timing motor which is represented at 88 in Figure 8. It also includes a double throw toggle switch represented at 89 in Figures 2 and 8 and an interlock relay 90 which operates a holding blade 91.

A manually operable switch is represented at 92 and is used for starting the apparatus in operation. The timing motor 88 is shown as mechanically connected to a normally open switch 93 that is included in the circuit to the interlock relay 90.

*Operation*

In outlining the operation of the apparatus above described, it will first be noted that the apparatus is susceptible of carrying out two types of tests.

In one type the specimen S is merely to be tensioned by the weights W and flexed upon every revolution of the cam follower 28. This means that the clutch elements 52 and 53 must be disengaged at all times. Under these conditions the toggle switch 89 is thrown to energize the solenoid 63, whereupon the shaft 54 is retracted against the influence of the spring 59 and the clutch elements maintained disengaged.

However, the preferred modus operandi is to have the clutch elements 52 and 53 engaged so that the specimen S will be stretched between its ends which are fixed but with the clutch being disengaged from time to time so as to permit the weights W to take up any slack which is created as an incident to the stretching. This mode of operation will now be described.

It will be assumed that the apparatus is in condition for having the test performed. This means that the control switch at 72 is closed by the proper positioning of the specimen as illustrated. The operator then closes the manually operable switch 92. This starts both the motors 20 and 88 into operation. The motor 20 rotates the cam follower 28 and with each revolution depresses the plunger 67 of the switch 66.

The motor 88 is preferably of the clock type and will be seen to rotate at a slow speed, say one revolution per minute. As this motor rotates it will close the switch 93. This will energize the interlock relay 90 and bring the holding blade 91 into a position closing the circuit to the clutch solenoid 63, that is, this circuit will be closed when the switch 66 is closed.

Closing of the switch 93 also is effective to energize the solenoid coil 63. Thus, the solenoid coil 63 is maintained energized by either of two parallel circuits, one including the switch 93 and the other including the switches 66 and 91.

The motor 88 will keep the switch 93 closed a predetermined time, which ordinarily will be a comparatively small percentage of its complete cycle. Thus, for one R. P. M. the switch 93 might be maintained closed five seconds. As the switch is opened the solenoid coil 63 is not immediately de-energized, because the holding blade 91 and switch 66 will complete the circuit thereto. However, the next time the cam 24 depresses the plunger 67, which is at its lowermost point of travel, the switch 66 is opened and this de-energizes the clutch coil 63 so as to permit the spring 59 to move the clutch elements 52 and 53 into engagement.

The reason for this operation is to insure that the clutch elements will become engaged exactly at the time the cam follower 28 is in its lowermost position, as it is important that the ends of the specimen be fixed when the weights W are in their lowermost position. This insures a taking out of the maximum amount of slack in the specimen by the weights.

As the motor 29 continues to rotate the switch 66 will open and close. However, nothing will happen by this action until the holding blade 91 is again brought into closed position by the coil 90, which will be energized by closing of the switch 93. What we have, in effect, is an arrangement in which the switch 93 might be called a starting switch which energizes the solenoid coil 63 and it is the switch 66 which de-energizes it.

This flexing and stretching of the specimen S continues until it fails. At the time of failure, the free end of the spring arm 74 will move outwardly under its spring tension as it will have been released from the felt. This releases the plunger 73 and the switch 72 is opened to de-energize the water valve solenoid 82, and shuts off the supply of water, and also stops both the motors 29 and 83.

At this point the operator may observe the counter 27 and determine the number of revolutions the specimen has undergone in making that particular test. Thus, good comparative results may be obtained.

While preferred specific embodiments of the invention are hereinbefore set forth, it is to be clearly understood that the invention is not to be limited to the exact constructions, devices and mechanisms illustrated and described, because various modifications of these details may be provided in putting the invention into practice within the purview of the appended claims.

We claim:

1. In the testing of paper making felts, the method of subjecting a specimen of such a felt to a fatigue test, which comprises the steps of: (a) anchoring one end of said specimen in fixed position; (b) intermittently applying tension to the other end of said specimen to take up slack therein; (c) fixing the position of said other end during those intervals when the tension is not effective thereon; and (d) repeatedly flexing and stretching said specimen between the ends thereof, the said stretching operation taking place while both ends are fixed.

2. In apparatus for subjecting a specimen of a felt to a fatigue test, the combination of: a fixed anchorage, a roller spaced from said anchorage, a specimen having one end connected to said anchorage and passing over said roller, a sprocket chain connected to the free end of said specimen, a sprocket wheel in engagement with said chain, said chain passing downwardly around said sprocket wheel and then upwardly over a second sprocket wheel, a weight on the free end of said chain, a clutch operatively associated with one of said sprockets for holding said sprocket in fixed position when said clutch is engaged, mechanism for intermittently applying said clutch, and means for flexing and stretching said specimen between said anchorage and roller.

3. In apparatus for subjecting a specimen of a felt to a fatigue test, the combination of: a fixed anchorage, a roller spaced from said anchorage, a specimen having one end connected to said anchorage and passing over said roller, a sprocket chain connected to the free end of said specimen, a sprocket wheel in engagement with said chain, said chain passing downwardly around said sprocket wheel and then upwardly over a second sprocket wheel, a weight on the free end of said chain, a clutch operatively associated with the first of said sprockets and adapted to hold said sprocket against rotation when the clutch is engaged, mechanism for intermittently causing engagement of said clutch as an automatic operation, means for flexing and stretching said specimen between said anchorage and roller, and means for supplying moisture to the specimen as it is tested.

4. In apparatus for testing a specimen of a paper making felt, and which apparatus includes water supply means, and mechanism for flexing and stretching said specimen, a control device for automatically discontinuing operation of said water supply and said flexing and stretching means as an incident to failure of said specimen, said control device comprising a main control switch, a spring arm normally engaging said switch under tension to maintain the circuit controlled thereby closed, and means at the free end of said spring arm for engaging the specimen to maintain said arm under tension, said arm being adapted to spring free upon failure of said specimen to open said switch.

5. In apparatus for testing a specimen of a paper making felt, and which apparatus includes water supply means and mechanism for flexing and stretching said specimen, a control device for automatically discontinuing operation of said water supply and said flexing and stretching means as an incident to failure of said specimen, said control device comprising a control switch including a plunger which maintains the circuit of said switch closed when the plunger is in depressed position, a pivotally mounted spring arm normally engaging said plunger under tension to maintain it depressed, a roller at the free end of said spring arm normally engaging said specimen to maintain said arm under tension, said roller being adapted to be released upon failure of said specimen to permit said arm to spring free under its resiliency and release said plunger.

6. In apparatus of the character described, the combination of a fixed anchorage, a roller spaced from said anchorage and adapted to have a specimen, which has one end secured to the said anchorage, pass thereover, a chain connected with the free end of said specimen in a position below said roller, a sprocket meshing with said chain, a weight operatively connected to said chain, a clutch operatively associated with said sprocket, cam means for flexing said specimen between said anchorage and said roller, and a control device for automatically causing engagement and disengagement of said clutch, said control device including means for engaging said clutch when the specimen is in substantially a straight line position between said anchorage and roller.

7. In apparatus of the character described the combination of a fixed anchorage adapted to have one end of the specimen to be tested secured thereto, a roller spaced in said anchorage adapted to have said specimen pass thereover, a sprocket chain connected to the free end of said specimen, a weight operatively suspended from the free end of said chain, a drive shaft between said anchorage and said roller and arranged substantially parallel to the axis of said roller, power means for driving said drive shaft, a cam mounted on said drive shaft, a cam arm carried by said cam in eccentric relation to the axis of said drive shaft, a cam follower on said arm engaging said specimen between said anchorage and roller, a sprocket wheel meshing with said chain, a clutch mechanism operatively associated with said sprocket wheel and adapted to hold said sprocket wheel immovable when the clutch is engaged, spring means normally maintaining said clutch mechanism in effective engagement, a solenoid adapted to be energized to overcome said spring means and disengage said clutch, a timing motor, mechanical connections between said motor and the circuit of said solenoid whereby said solenoid is intermittently energized to disengage said clutch, and a micro-switch included in said circuit and adapted to be engaged by said cam to cause de-energization of said solenoid to take place only when said cam follower is in its lowermost position.

8. In apparatus of the character described the combination of a fixed anchorage adapted to have one end of the specimen to be tested secured thereto, a roller spaced in said anchorage adapted to have said specimen pass thereover, a shower pipe spaced above said anchorage and roller and substantially co-extensive with the space therebetween, means for supplying water to said pipe, a sprocket chain connected to the free end of said specimen, a weight operatively suspended from the free end of said chain, a drive shaft between said anchorage and said roller and arranged substantially parallel to the axis of said roller, power means for driving said drive shaft, a cam mounted on said drive shaft, a cam arm carried by said cam in eccentric relation to the axis of said drive shaft, a cam follower on said arm engaging said specimen between said anchorage and roller, a sprocket wheel meshing with said chain, a clutch mechanism operatively associated with said sprocket wheel and adapted to hold said sprocket wheel immovable when the clutch is engaged, spring means normally maintaining said clutch mechanism in effective engagement, a solenoid adapted to be energized to overcome said spring means and disengage said clutch, a timing motor, mechanical connections between said motor and the circuit of said solenoid whereby said solenoid is intermittently energized to disengage said clutch, a micro-switch included in said circuit and adapted to be engaged by said cam to cause de-energization of said solenoid to take place only when said follower is in its lowermost position, and master means for automatically discontinuing operation of said water supply and power means for driving said drive shaft and said timing motor co-incident with failure of said specimen.

9. In apparatus for subjecting a specimen of a felt to a fatigue test, the combination of: fixed anchorage for one end of a specimen, a support member spaced from said anchorage and adapted to have the specimen passed thereover for support thereby, a weight, means operatively connecting said weight to the free end of the specimen beyond said support member, means positioned between said anchorage and said support member for repeatedly flexing the specimen between said fixed anchorage and said support member, and means operably connected with said means connecting said weight with the specimen to releasably hold the same in a fixed position while the specimen is flexed.

10. In apparatus of the character described, the combination of, a fixed anchorage, a support member spaced from said anchorage and adapted to have a specimen which has one end secured to the said anchorage passed thereover, a chain having means for connecting the same to the free end of the specimen after it passes over said support member, a sprocket meshing with said chain, tensioning means operatively connected with said chain to tension the chain and a specimen extending between the said chain and said fixed anchorage, clutch means releasably connected with said sprocket to hold the same non-rotatively when engaged therewith, eccentrically operating means for flexing a specimen between said anchorage and said support member, and a control mechanism for automatic engagement and disengagement of said clutch, said control mechanism including means engaged by said eccentrically operating means for rendering said clutch inactive when the specimen between said anchorage and said support member is in a state of minimum flex.

11. In the testing of paper making felts, the method of subjecting a specimen of such a felt to a fatigue test, which comprises the steps of: (a) fixedly positioning opposite ends of a test specimen with the specimen under tension, (b) repeatedly stretching the specimen while so tensioned, (c) intermittently releasing one end of the specimen while the other end remains in its fixed position and concurrently therewith retensioning the specimen to remove slack therefrom.

12. In the testing of paper making felts, the method of subjecting a specimen of such a felt to a fatigue test, which comprises the steps of: (a) fixedly positioning opposite ends of a test specimen with the specimen under tension of a predetermined value, (b) repeatedly stretching the specimen while so tensioned, (c) intermittently releasing one end of the specimen without releasing tension thereon and concurrently therewith retensioning the specimen to the initial tension value.

JOHN P. KOESTER.
ROBERT J. PURDY.
ORION W. BERGLUND.

REFERENCES CITED

The following references are of record in the file of this patent:

UNITED STATES PATENTS

| Number | Name | Date |
|---|---|---|
| 889,993 | Vaughn et al. | June 9, 1908 |
| 1,499,546 | Oxley | July 1, 1924 |
| 1,638,111 | Coffin | Aug. 9, 1927 |
| 1,749,991 | Valentine et al. | Mar. 11, 1930 |
| 1,869,884 | Curtis | Aug. 2, 1932 |
| 2,066,311 | Appel et al. | Jan. 5, 1937 |
| 2,154,277 | Moore | Apr. 11, 1939 |
| 2,157,092 | Allen et al. | May 9, 1939 |
| 2,170,640 | Kenyon | Aug. 22, 1939 |
| 2,291,086 | Lessig | July 28, 1942 |
| 2,336,956 | Peskin | Dec. 14, 1943 |

FOREIGN PATENTS

| Number | Country | Date |
|---|---|---|
| 740,502 | France | Nov. 14, 1932 |

OTHER REFERENCES

Walker, article on pages 15 to 17 of Bell. Lab. Record, September 1942, vol. XXI, No. 1.